United States Patent [19]
Ayache

[11] Patent Number: 6,061,803
[45] Date of Patent: *May 9, 2000

[54] VARIABLE FREQUENCY CLOCK FOR AN ELECTRONIC SYSTEM AND METHOD THEREFOR

[75] Inventor: Elie Ayache, Milpitas, Calif.

[73] Assignee: International Microcircuits, Inc., Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/151,938

[22] Filed: Nov. 15, 1993

[51] Int. Cl.$^7$ ...................................................... G06F 1/08
[52] U.S. Cl. ............................................. 713/501; 713/320
[58] Field of Search ................................... 713/400, 401, 713/500, 501, 300, 320, 323, 324, 330

[56] References Cited

U.S. PATENT DOCUMENTS

| | | | |
|---|---|---|---|
| 4,980,836 | 12/1990 | Carter et al. | 364/483 |
| 5,167,024 | 11/1992 | Smith et al. | 395/375 |
| 5,218,704 | 6/1993 | Watts, Jr. et al. | 395/750 |
| 5,396,635 | 3/1995 | Fung | 364/264.6 |
| 5,420,808 | 5/1995 | Alexander et al. | 713/501 |

OTHER PUBLICATIONS

Tanenbaum, Andrew "Structure/Computer Organization", second edition, 1984, pp. 10–12.

*Primary Examiner*—Viet D. Vu
*Attorney, Agent, or Firm*—Harry M. Weiss; Jeffrey Weiss; Paul W. Davis

[57] ABSTRACT

An activity sensor monitors a microprocessor based system for a change in a logic state. In response to the change, the activity sensor provides a reset timer pulse to a delay timer circuit. The delay timer is a counter that stores a signal representation of the number of timing pulses provided by a timing clock. In response to the timer reset signal, the delay timer is reset. When the timer reset pulse is not provided for a predetermined interval, the delay timer generates a timeout pulse that causes a reduction in the frequency of a system clock.

17 Claims, 2 Drawing Sheets

VARIABLE FREQUENCY CLOCK FOR AN ELECTRONIC SYSTEM AND METHOD THEREFOR

BACKGROUND OF THE INVENTION

1. Field of the Invention

This invention is in the general field of methods and apparatus for reducing power dissipated by an electronic system and, more particularly is a method and apparatus for reducing power dissipated by an electronic system by varying a system clock frequency.

2. Description of the Prior Art

In an electronic system that includes semiconductor devices, such as a microprocessor, power dissipation is of critical importance because it causes a temperature rise that may be destructive. In order to tolerate the temperature rise, it is desirable to operate the microprocessor at as low a temperature as possible. The desirability of operating at the low temperature may necessitate the use of a heat sink that is expensive and cumbersome.

The system usually includes a system clock that provides clock pulses which synchronize internal operations of the microprocessor to other elements of the system. One criteria of the usefulness of the microprocessor is the maximum clock frequency at which it will operate. However, an increase in clock frequency results in an increased power dissipation. Hence, the increased power dissipation militates against the operation of the microprocessor at the maximum clock frequency.

A significant amount of power is collectively dissipated by personal computers because their use as a tool of industry and their home use has mushroomed. Because of the mushroomed usage, construction of what is known as a GREEN PC is under consideration for environmental reasons. The underlying concept of the GREEN PC is operation at a reduced power level when the GREEN PC is idle. Heretofore, reduction in the power level of an electronic system when it is idle has been uneconomical and impractical.

SUMMARY OF THE INVENTION

An object of the present invention is to provide apparatus and a method for reducing power dissipated by an electronic system.

Another object of the present invention is to provide apparatus and a method for reducing the frequency of a clock of an electronic system when the system is idle.

BRIEF DESCRIPTION OF A PREFERRED EMBODIMENT

According to the present invention, the frequency of a clock of an electronic system is reduced in response to a logic state of the system not changing for a predetermined interval of time.

The present invention is a simple, economical and environmentally sound way to operate digital components efficiently.

Other objects, features and advantages of the present invention will be apparent from the following description of the preferred embodiment and the accompanying drawing.

DESCRIPTION OF THE PREFERRED EMBODIMENT

Figure 1:
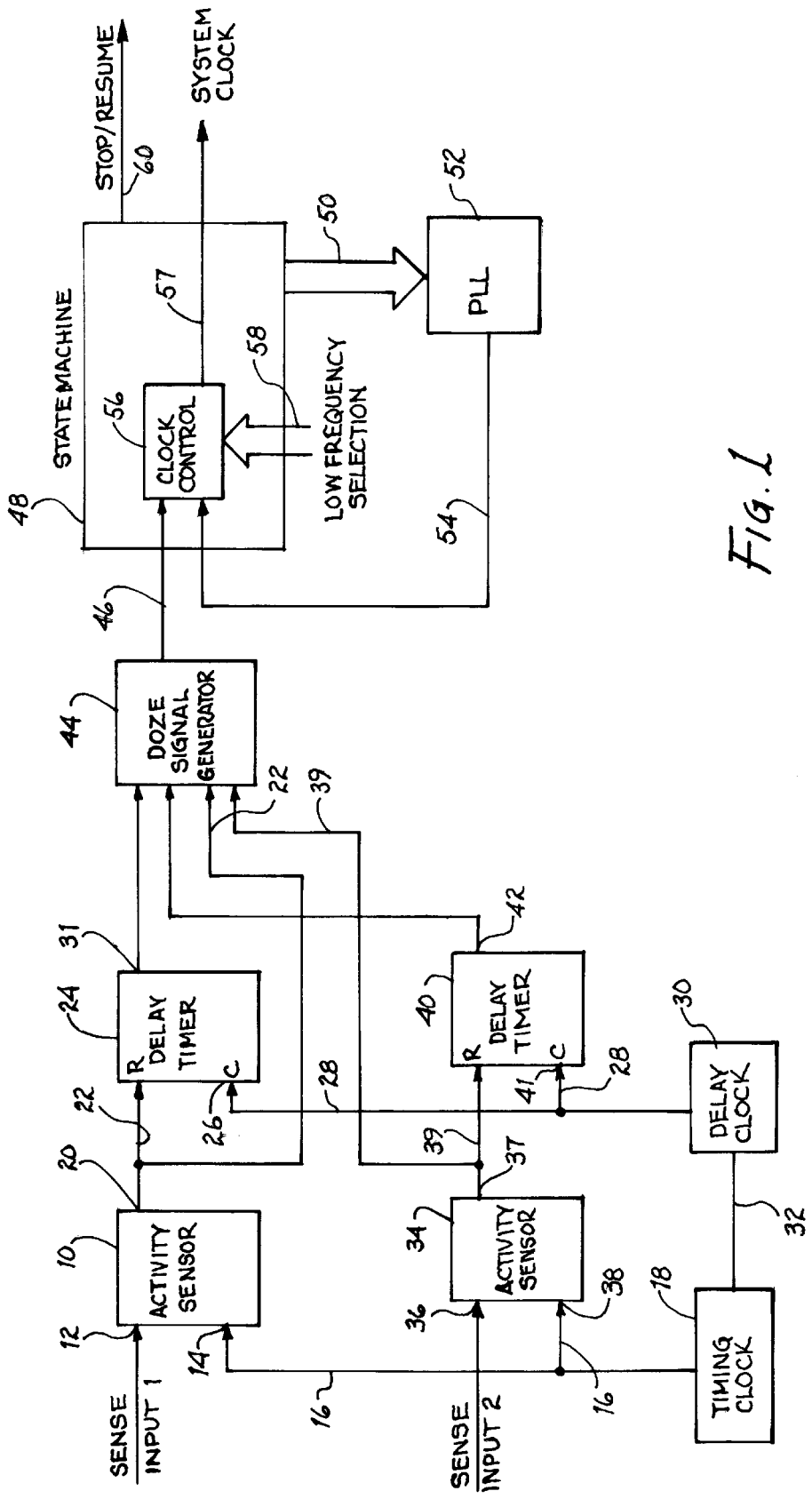
FIG. 1 is a block diagram of the preferred embodiment of the present invention.

As shown in FIG. 1, an activity sensor 10 has an input 12 connected to the output of a first digital component of a computer (not shown). Additionally, activity sensor 10 has a clock input 14 connected through a signal line 16 to the output of a timing clock 18 whereby timing clock pulses are provided to input 14. In response to a change in the output of the first component from a signal representation of a logic "1" to a signal representation of a logic "0" or vice versa, activity sensor 10 provides a timer reset pulse at an output 20 thereof. Moreover, the reset pulse is synchronized to the timing clock pulses.

Output 20 is connected through a signal line 22 to a reset input of a delay timer 24. Additionally, timer 24 has a clock input 26 connected through a signal line 28 to a delay clock 30 whereby delay clock pulses are provided to timer 24.

Timer 24 stores a signal representation of a cumulative number of delay clock pulses. However, in response to the timer reset pulse at output 20, the cumulative number is reset to zero. In other words, timer 24 is reset.

When the timer reset pulse is not provided at output 20 for a predetermined interval of time, timer 24 generates a time-out signal at an output 31 thereof. As explained hereinafter, the time-out signal at output 31 is utilized in reducing the frequency of a system clock.

Figure 2:
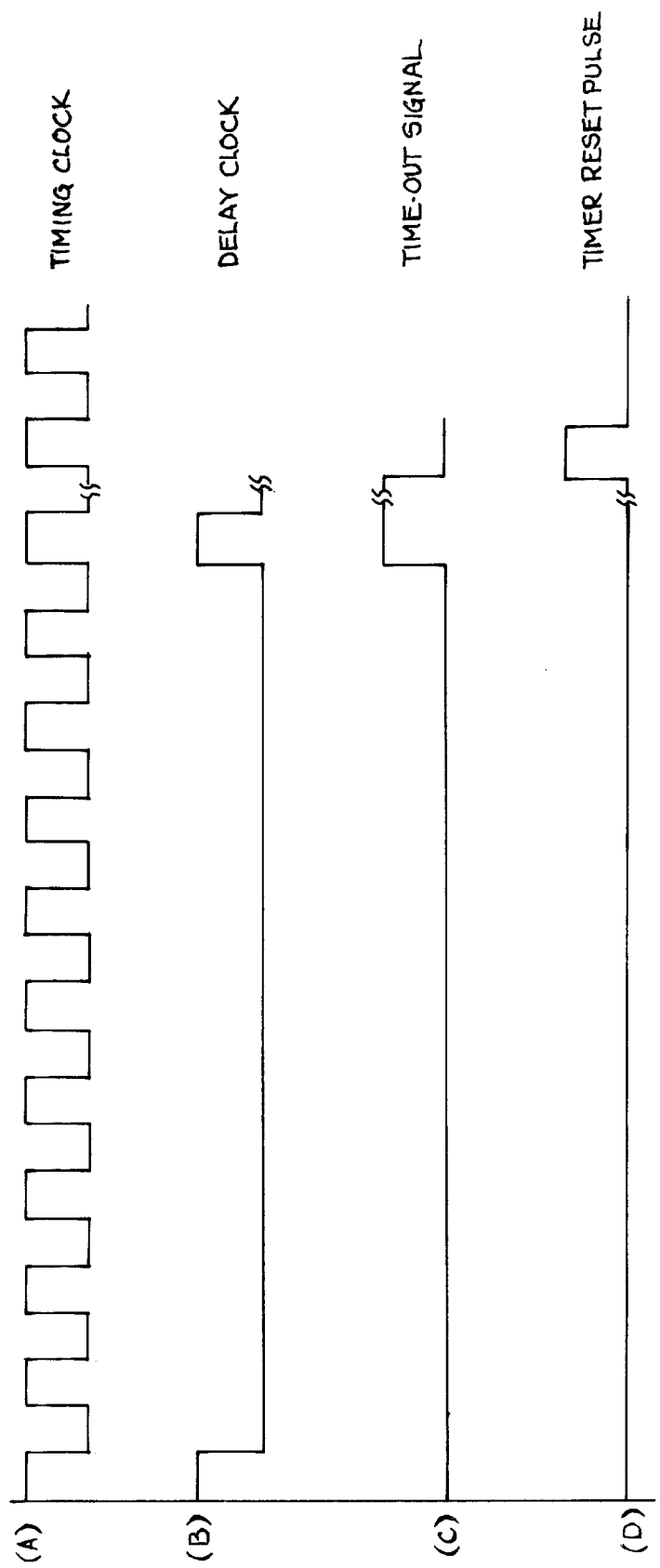
FIG. 2 is a showing of waveshapes in the embodiment of FIG. 1, all on the same time base.

As shown in FIG. 2, the outputs of timing clock 18 (FIG. 2(a)), delay clock 30 (FIG. 2(b)), the time-out signal (FIG. 2(c)) and the timer reset pulse at output 20 (FIG. 2(d)) are synchronized to each other. Moreover, the frequency of timing clock 18 is much greater than the frequency of the delay clock 30 to achieve accuracy. Clocks 18, 30 are connected together through a signal line 32 to provide for synchronization. Synchronized clocks are well known to those skilled in the art.

An activity sensor 34, similar to activity sensor 10, has an input 36 connected to the output of a second digital component of the computer. Additionally, activity sensor 34 has a clock input 38 connected through signal line 16 to timing clock 18 whereby timing clock pulses are provided to input 38. In response to a change in the output of the second component from a signal representation of a logic "1" to a signal representation of a logic "0" or vice versa, activity sensor 34 provides a timer reset pulse at an output 37 thereof. Moreover, the timer reset pulse at output 37 is synchronized to the timing clock pulses.

Output 37 is connected through a signal line 39 to a reset input of a delay timer 40. Additionally, timer 40 has a clock input 41 connected through signal line 28 to delay clock 30 whereby delay clock pulses are provided to timer 40. Timer 40 is similar to timer 24. As with timer 24, when the timer reset signal is not provided at output 36 for a predetermined interval of time, timer 40 generates a time-out pulse at an output 42 thereof.

Outputs 31, 42 are connected to respective inputs of a doze signal generator 44. Similarly, outputs 20, 37 are connected through signal lines 22, 39, to respective inputs of generator 44. In concurrent response to time-out signals being provided at outputs 31, 42 and an absence of a reset signal at outputs 20, 37, generator 44 provides a doze signal through a signal line 46 to a state machine 48 at an input thereof. In other words, the doze signal is generated when outputs of the first and second components do not change during the predetermined interval of time.

In response to the doze signal, state machine 48 provides a digital signal representation of a low frequency code through a plurality of signal lines 50 to a phase locked loop 52. Phase locked loop 52 is connected through a signal line 54 to an input of a clock control unit 56 included in state machine 48. System clock pulses are provided by phase locked loop 52 to clock control 56. The system clock pulses pass through clock control 56 to the computer via a signal line 57. The frequency of the system clock changes in accordance with the low frequency code in a manner described hereinafter.

A signal representation of a desired low frequency of operation of the computer in response to the doze signal is provided in any suitable manner through a plurality of signal lines 58 to clock control 56. When the desired low frequency is zero, a stop signal is provided through a stop/resume line 60 to the central processing unit (CPU) of the computer in response to the doze signal. Additionally, clock control 56 does not pass system clock pulses to the computer. At the termination of the doze signal, a resume signal is provided through line 60. After a delay of 2.2 milliseconds, clock control 56 passes the system clock pulses at the normal operating frequency. The normal operating frequency is in a range of 33 megahertz to 100 megahertz. The 2.2 millisecond delay provides for a start up time of the computer.

When the desired low frequency is 8 megahertz, for example, phase locked loop 52 provides system clock pulses at the 8 megahertz frequency through clock control 56 and line 57 to the computer in response to the doze signal. Neither the stop nor resume signals are used to control the response of the computer.

While the invention has been described with reference to a preferred embodiment thereof, it should be understood by those skilled in the art that changes in form and detail may be mede therein without departing from the spirit and scope of the invention.

We claim:

1. Apparatus for reducing the frequency of a system clock of an electronic system comprising, in combination:
    binary input means for determining the activity state of a system component;
    hardware activity sensor means coupled to said binary input means for producing a timer reset pulse
    a timing clock coupled to said hardware activity sensor means;
    a delay clock coupled to said timing clock;
    hardware timer means coupled to said hardware activity sensor means and to said delay clock for generating a timeout pulse when said timer reset pulse is absent for a predetermined interval of time;
    signal generator means coupled to said hardware activity sensor means and to said hardware timer means for generating a doze signal; and
    frequency altering means coupled to said signal generator means for altering said frequency of said system clock in response to said doze signal.

2. Apparatus for reducing the frequency of a system clock of an electronic system in accordance with claim 1 wherein said hardware activity sensor means comprises at least one hardware sensor.

3. Apparatus for reducing the frequency of a system clock of an electronic system in accordance with claim 2 wherein said hardware activity sensor means comprises a plurality of hardware sensors equal in number to said one or more components said apparatus is monitoring wherein each of said plurality of hardware sensors is individually coupled to a separate and different one of said one or more components.

4. Apparatus for reducing the frequency of a system clock of an electronic system in accordance with claim 3 wherein said hardware timer means comprises at least one hardware timer.

5. Apparatus for reducing the frequency of a system clock of an electronic system in accordance with claim 4 wherein said at least one hardware timer further comprises a plurality of hardware timers equal in number to said one or more components said apparatus is monitoring wherein each of said plurality of hardware timers is individually coupled to a separate and different one of said plurality of hardware sensors.

6. Apparatus for reducing the frequency of a system clock of an electronic system in accordance with claim 1 wherein said frequency altering means comprises:
    a state machine coupled to said signal generator means;
    a phase lock loop circuit coupled to said state machine; and
    a clock control circuit within said state machine.

7. Apparatus for reducing the frequency of a system clock of an electronic system in accordance with claim 6 wherein said state machine sends a stop signal to a Central Processing Unit (CPU) of the system when a desired frequency is zero.

8. Apparatus for reducing the frequency of a system clock of an electronic system in accordance with claim 1 wherein said timer reset pulse is synchronized to a timing clock.

9. Apparatus for reducing the frequency of a system clock of an electronic system in accordance with claim 1 wherein said hardware activity sensor provides a pulse in response to said change.

10. Apparatus for reducing the frequency of a system clock of an electronic system in accordance with claim 8 wherein said hardware timer means stores a signal representation of a cumulative number of pulses provides by a delay clock, said cumulative number being reset to zero in response to said timer reset pulse.

11. Apparatus for reducing the frequency of a system clock of an electronic system in accordance with claim 10 wherein said timeout pulse is synchronized to said delay clock pulses.

12. Apparatus for reducing the frequency of a system clock of an electronic system in accordance with claim 10 wherein said timing clock and said delay clock are synchronized to each other.

13. Apparatus for reducing the frequency of a system clock of an electronic system in accordance with claim 12 wherein the frequency of pulses provided by said timing clock is greater than the frequency of pulses provided by said delay clock.

14. A method of reducing power dissipated by an electronic system comprising the steps of:
    providing a binary input means for determining the activity state of a system component;
    providing a hardware activity sensor means coupled to said binary input means for producing a timer reset pulse;
    providing a timing clock coupled to said hardware activity sensor means;
    providing a delay clock coupled to said timing clock;
    providing a hardware timer means coupled to said hardware activity sensor means and to said delay clock for generating a timeout pulse when said timer reset pulse is absent for said a predetermined interval of time;

providing a signal generator means coupled to said hardware activity sensor means and to said hardware timer means for generating a doze signal;

providing a frequency altering means coupled to said signal generator means for altering said frequency of said system clock in response to said doze signal;

monitoring a component of a system by a hardware activity sensor for a change in an output thereof from a logic "1" to a logic "0" or vice versa; and reducing the frequency of a clock of said system when said output is constant for a predetermined interval of time.

15. The method of claim 14 further comprising the steps of:

generating a reset pulse in response to said change;

generating a timeout pulse when said output is constant during said predetermined interval of time; and generating a doze signal in response to said timeout pulse and an absence of said reset pulse.

16. The method of claim 15 wherein said step of reducing includes reducing said clock frequency in response to said doze signal.

17. The method of claim 15 further including the steps of:

storing in a delay counter a signal representation of a cumulative number of clock pulses provided by a delay clock, said delay counter generating said timeout pulse; and resetting said cumulative number to zero in response to said reset pulse.

* * * * *